United States Patent
Tomar et al.

(10) Patent No.: US 9,852,284 B2
(45) Date of Patent: Dec. 26, 2017

(54) STORAGE ISOLATION USING I/O AUTHENTICATION

(71) Applicant: ORACLE INTERNATIONAL CORPORATION, Redwood Shores, CA (US)

(72) Inventors: Samarjeet Tomar, Bangalore (IN); Prasad Bagal, Saratoga, CA (US); Harish Nandyala, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/581,457

(22) Filed: Apr. 28, 2017

(65) Prior Publication Data

US 2017/0228532 A1 Aug. 10, 2017

Related U.S. Application Data

(63) Continuation of application No. 14/814,354, filed on Jul. 30, 2015, now Pat. No. 9,660,987.

(51) Int. Cl.
*H04L 29/06* (2006.01)
*G06F 21/44* (2013.01)
*G06F 13/10* (2006.01)

(52) U.S. Cl.
CPC ............ *G06F 21/44* (2013.01); *G06F 13/102* (2013.01)

(58) Field of Classification Search
CPC . H04L 63/08; H04L 63/0876; H04L 63/0807; H04L 63/10; H04L 63/123;
(Continued)

(56) References Cited

U.S. PATENT DOCUMENTS

| 2003/0177367 A1* | 9/2003 | King | G06F 21/80 713/185 |
| 2011/0145243 A1* | 6/2011 | Yudenfriend | G06F 9/526 707/737 |

(Continued)

OTHER PUBLICATIONS

L. Zhu et al., "The Kerberos Version 5 Generic Security Service Application Program Interface (GSS-API) Mechanism: Version 2", Network Working Group, dated Jul. 2005, 20 pages.

(Continued)

*Primary Examiner* — Yogesh Paliwal
(74) *Attorney, Agent, or Firm* — Hickman Palermo Becker Bingham LLP

(57) ABSTRACT

Techniques are described for logically isolating data I/O requests from different operating systems (OSes) for a same multi-tenant storage system (MTSS). Techniques provide for OSes and the MTSS to obtain security tokens associated with the OSes. In an embodiment, an OS uses a security token to generate an authentication token based on the contents of a data input/output (I/O) request and sends the authentication token to the MTSS along with the data I/O request. When an MTSS receives such data I/O request, MTSS retrieves its own copy of the security token associated with the OS and generates its own authentication token based on the contents of the received data I/O request. If the authentication token generated by the MTSS matches the authentication token generated by the OS, then the data I/O request is successfully authenticated. Otherwise, if the authorization tokens fail to match, then the data I/O request has been compromised. For example, either the contents of data I/O request has been tampered with, or an entity other than the OS, has sent the data I/O request in the first place. Accordingly, the data I/O request may not be serviced by the MTSS.

20 Claims, 5 Drawing Sheets

(58) Field of Classification Search
CPC ........ G06F 21/44; G06F 21/00; G06F 13/102; H04W 12/08
USPC .......................................................... 726/6
See application file for complete search history.

(56) References Cited

U.S. PATENT DOCUMENTS

| 2013/0074091 A1* | 3/2013 | Xavier | G06F 9/5011 718/104 |
| 2017/0034165 A1 | 2/2017 | Bagal | |

OTHER PUBLICATIONS

C. Neuman et al., "The Kerberos Network Authentication Service (V5)", Network Working Group, Request for Comments: 4120, dated Jul. 2005, 138 pages.

* cited by examiner

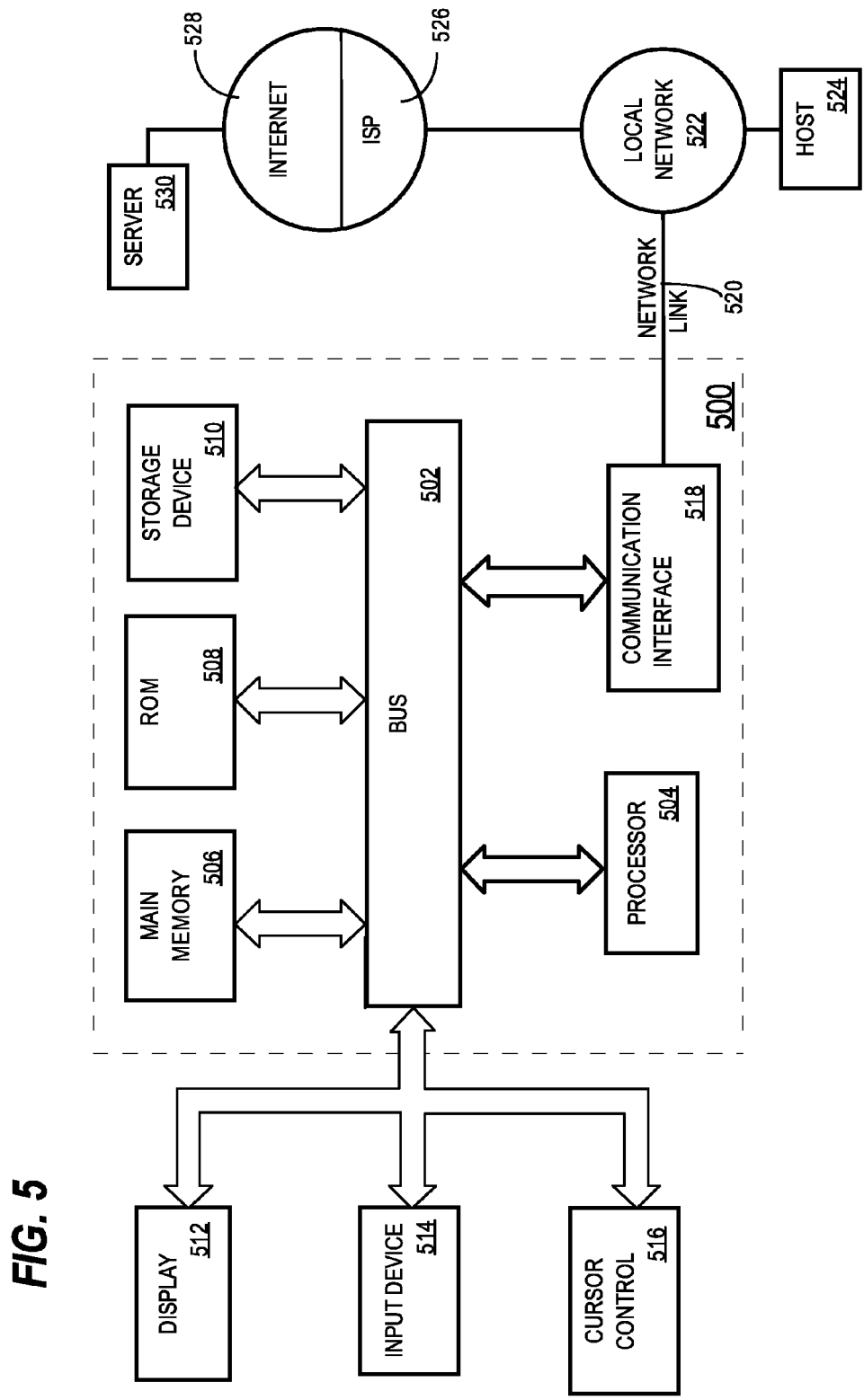

STORAGE ISOLATION USING I/O AUTHENTICATION

BENEFIT CLAIM

This application claims the benefit under 35 U.S.C. §120 as a Continuation of U.S. patent application Ser. No. 14/814,354, filed Jul. 30, 2015, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The present invention relates to information security of storage systems, specifically to storage isolation among tenants of shared storage.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A "multi-tenant storage system" (MTSS) is a storage system that includes storage resources allocated to multiple "tenants." Each tenant is a computer system that uses the MTSS for storing data for computer system's use. A multi-tenant storage system is particularly useful in the cloud computing environment, where compute resources are allocated or re-allocated based on the demands of each computer system. To achieve greater resource utilization, shared storage resource pools are utilized on an MTSS, from which storage resources are allocated to multiple client computer systems that may be part of the cloud computing environment.

Accordingly, the MTSS receives and services input/output (I/O) data requests for storage resources from more than one computer system. The I/O requests may contain commands to the MTSS to read or write data into storage resources. These received I/O requests are assumed to be authenticated within the issuing computer systems prior to sending the I/O requests to the MTSS. For example, once an I/O request enters the computer system operating system kernel, the I/O request is implicitly trusted because some other entity (e.g., an application or the file system) is expected to have verified the I/O requester's identity and the integrity of the request contents. Thus, the MTSS may not further verify the I/O requests or the identities of the client computer systems initiating the I/O requests.

However, if a client computer system of an MTSS is compromised, then the authentication relied upon by the MTSS is compromised as well. The client computer system may then send tampered I/O requests to the MTSS, and the MTSS, without further authenticating the requests, may service the tampered I/O requests causing corruption of stored data addressed in the I/O requests.

In shared storage systems, such as an MTSS, there is also an enhanced risk of a compromised client computer system affecting storage resources that are allocated to other client computer systems. Since the MTSS has storage resources provisioned to different client computer systems, a malicious I/O request may be tampered to be directed to another client computer system's provisioned storage resources. Once the MTSS services such a request, the other computer system's data may be corrupted, and the other computer system may also get infected and compromised through the corrupted data.

For restricting access to the appropriate storage of the MTSS, "LUN masking" and "zoning" approaches may be used. "LUN masking" refers to the MTSS hiding/masking some storage resources (LUNs) between tenant computer systems. Zoning restricts groups of client computers from interacting with one another by subdividing and thus, isolating their data I/O request path to the MTSS. Both LUN masking and zoning use either IP addresses or World Wide Names (WWNs) for identifying client computer systems and the storage resources on the network. Both forms of identification are easy to spoof. Moreover, some implementations of LUN masking rely on a client computer system to "behave well" and "ignore" the storage resources that are not provisioned for the client computer system. Furthermore, LUN masking and zoning also imply that the entire storage pool is not available to all hosts—a form of physical isolation that is not ideal for resource utilization and re-allocation typical for the cloud environment.

BRIEF DESCRIPTION OF THE DRAWINGS

In the drawings:

FIG. 5 is a block diagram that illustrates a computer system 500 upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques discussed herein provide for a logical isolation of storage resources that are allocated to a particular client of an MTSS from the MTSS. An MTSS client is any operating system that runs on a virtual machine (VM) or a computer system and is uniquely identifiable to the MTSS. In an embodiment, the logical isolation is achieved by having a trusted third part authority, such as an authentication system, that supplies necessary information, such as security tokens, to the MTSS and MTSS clients. "Authentication system" (AS) refers herein to a computer system configured for management of security tokens. The term "security token" refers herein to data that uniquely verifies an identity of an entity, such as a user of a computer system, a computer system or any component within a computer system. Non-limiting examples of security tokens are cryptographic keys, passphrases, and biometric data. In various embodiments, security tokens are generated, exchanged, stored, used, and replaced in an authentication system.

The MTSS client uses a security token, a copy of which is stored in the authentication system, to generate an authentication token based on contents of an I/O request to be sent to the MTSS. The MTSS client sends the authentication token within the I/O request to the MTSS. The MTSS uses information from the authentication system for establishing the identity of the MTSS client. Based on the information, the MTSS verifies that the request indeed originated from the client computer system. In a related embodiment, based on the information from the authentication system, the MTSS also determines whether the contents of the I/O request were tampered with (either at the client itself or on the network). If the MTSS determines that the I/O request does not correctly identify the MTSS client that the request purports being sent from, or if the MTSS determines that the I/O request has been tampered with, then the MTSS fails to service the I/O request and may notify the MTSS client about the failure.

Authentication Based Storage Isolation System Overview

Figure 1:
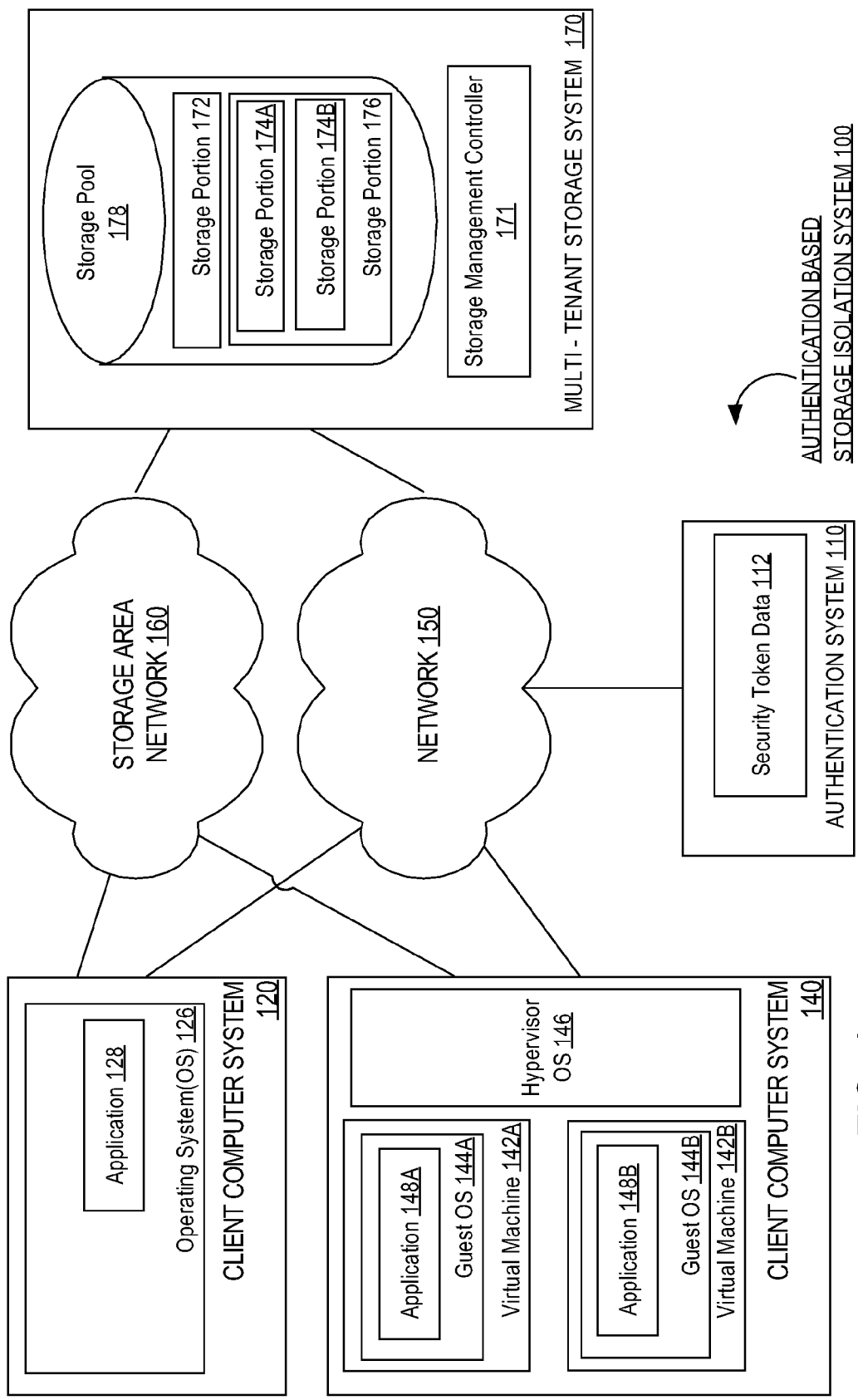
FIG. 1 depicts an embodiment of an authentication based storage isolation system 100.

FIG. 1 depicts an embodiment of an authentication-based storage isolation system 100. In storage isolation system 100, MTSS 170 includes storage pool 178 configured and managed by storage management controller 171. Storage management controller 171 has provisioned storage pool 178 to allocate storage portions 172 and 176 to MTSS clients such as operating system (OS) 126, guest OS 144A-B and hypervisor OS 146. The terms "OS," "guest OS" and "hypervisor OS" all refer to various embodiments of an operating system. The term "storage portion," as referred to herein, is a collection of storage resources allocated out of a storage pool to an operating system for persistent storage of data. Each storage portion includes one or more memory address spaces for storing data on storage media, of storage pool 178, that includes, but is not limited to, physical magnetic discs and flash/non-flash based solid state disks.

In order for client computer system 120 to utilize a storage portion, OS 126 provisions storage portion 172 of MTSS 170. The OS exposes the storage portion to the application running within the context of the operating systems as one or more logical persistent storage drives (LUNs). To process data I/O requests for the one or more LUNs, the client computer system is connected to MTSS 170.

In one embodiment, MTSS 170 is connected to client computer system 120 through a dedicated storage network (SAN) such as SAN 160. Non-limiting examples of storage networks are a fiber channel (FC) based communication network or a dedicated high speed Ethernet based communication network. Alternatively or additionally, MTSS 170 is connected to client computer system 120 through network 150. Networks 150 includes a communications network, such as any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network. In an embodiment, SAN 160 may be part of Network 150 and includes any combination of the above mentioned networks.

Client computer system 120 and MTSS 170 are also connected to authentication system 110 through network 150. Authentication system 110 includes security token data 112 for storing security tokens in association with MTSS clients whose identities the security tokens represent. A security token for an MTSS client may be provided to authentication system 110 to store or may be generated by authentication system 110 itself. Even in the embodiment where the security token is provided by the MTSS client, authentication system 110 may periodically re-generate the security token for the MTSS client and push the security token back to the MTSS client and/or MTSS.

In an embodiment, a connection with authentication system 110 is secured through the authentication of the connecting entity. Authentication system 110 may use one-way or mutual certificate based authentication to establish a secured socket layer (SSL) connection with a client computer system or MTSS. Other types of authentications may be used to connect with authentication system 110. However, the exact protocol or combination of protocols used for secure communications with authentication system 110 over network 150 is not critical to the techniques described herein.

In an embodiment, MTSS 170 connects to authentication system 110 to obtain security tokens for received data I/O requests. When MTSS 170 receives a data I/O request, storage management controller 171 extracts and/or derives MTSS client identification information from the data I/O request. Identification information includes information about the operating system that originated the data I/O request and/or information about the client computer system that hosts the operating system. Non-limiting examples of identification information include internet address (IP address), Small Computer System Interface (SCSI) name, a media access control (MAC) address, world-wide name, host name, fully qualified domain name. Based on identification information, storage management controller 171 queries authentication system 110 for the security token associated with the MTSS client. Once the security token is retrieved, in some embodiments, storage management controller 171 caches the security token locally for further use when new data I/O requests are received from the same client. The security token is then used to verify the identity of MTSS clients and integrity of data I/O requests, as discussed further in the Generating Authentication Token and Authenticating Data I/O Request sections.

OS 126 of client computer system 120 connects to authentication system 110 to register its identity with authentication system 110. In an embodiment, when storage portion 172 is allocated to OS 126, OS 126 requests authentication system 110 to generate a security token and store the security token in association with OS 126 identification information. The security token is returned to OS 126 for OS 126 to use the security token in sending data I/O requests to MTSS 170. Additionally or alternatively, OS 126 stores the security token locally on computer system 120. In another embodiment, when storage portion 172 is allocated to OS 126, OS 126 generates a security token itself and requests authentication system 110 to store the generated token in security token data 112 in association with the identification information. Additionally or alternatively, OS 126 stores the security token locally on computer system 120. Once the security token is stored in authentication system 110 and/or locally on computer system 120, OS 126 exposes the one or more LUNs representing the allocated storage portion 172 to the applications running in OS 126. Thus, application 128 may make a data write or read (I/O) request to the one or more LUNs. Upon such a request, OS 126 generates an authentication token using the security token and embeds the authentication token within the data I/O request sent to MTSS 170 for servicing.

In another embodiment, a client computer system may host multiple virtual machines that utilize MTSS. For example, client computer system 140 hosts hypervisor OS 146 on which virtual machines 142A-B run. Hypervisor OS 146, similar to OS 126, has storage portion 176 allocated to itself from storage pool 178 to use for persistent storage. Hypervisor OS 146 may register its identification information with authentication system 110 and have the corresponding security token and hypervisor OS 146 identification information stored in security token data 112 in authentication system 110. Additionally or alternatively, the security token data 112 may be stored locally on client computer system 140. Thus, the security token may be locally and/or remotely queried from security token data 112 using hypervisor OS 146 identification information. For example, when hypervisor OS 146 receives data I/O requests for storage portion 176, hypervisor OS may query authentication system 110 for the security token stored in security token data 112 to generate an authentication token and embed the generated authentication with data I/O request sent to MTSS 170.

During the provisioning of virtual machines 142A-B, client computer system 140's resources are allocated to the virtual machines. Such resources also include persistent storage. To allocate persistent storage, new LUNs are created and exposed to virtual machines from the LUNs of a hypervisor OS, in an embodiment. Hypervisor OS 146 allocates out of storage portion 176 storage portions 174A-B for LUNs of virtual machines 142A-B, respectively. Guest OS 144A is provisioned on virtual machine 142A to utilize LUNs that are mapped to storage portion 174A.

In an embodiment, guest OS 144A registers its identification information with authentication system 110. As a result of the registration with authentication system 110, a security token generated for guest OS 144A is stored in association with the identification information of guest OS 144A in authentication system 110. Additionally or alternatively, the security token may be stored locally on client computer system 140. Utilizing the security token, in response to a data I/O request by Application 148A to a LUN of storage portion 174A, guest OS 144A generates an authentication token to embed with a data I/O request to hypervisor OS 146. In an embodiment, once the data I/O request enters hypervisor OS 146, hypervisor OS 146 may generate another authentication token based on hypervisor OS 146 security token and embed the authorization token in the data I/O request sent to MTSS 170. In such an embodiment, storage management controller 171 may authenticate both authorization tokens: guest OS 144A generated authentication token and hypervisor OS 146 generated authentication token, before servicing the data I/O request against storage portion 174A of storage pool 178.

In one embodiment, to authenticate received authentication tokens, storage management controller 171 associates the provisioning OS identification information with the storage portion provisioned and stores such information in MTSS 170. For example, storage management controller associates OS 126 identification information with storage portion 172, hypervisor OS 146 identification information with storage portion 176, guest OS 144A identification information with storage portion 174A and guest OS 144B identification information with storage portion 174B. Thus, to authenticate an authentication token of a data I/O request directed to a particular storage portion, storage management controller 171 retrieves the OS identification information associated with the particular storage portion from MTSS 170, and then uses the OS identification information to retrieve the security token, associated with the OS specified in the OS identification information. In other embodiments, the storage management controller 171 extracts the OS identification information from a data I/O request itself and uses the OS identification information to retrieve the security token.

Regardless of the technique used to retrieve OS identification information, once a security token is obtained from security token data 112 based on the OS identification information, the security token may be cached locally on MTSS 170. In another embodiment, the security token is queried from security token data 112 of authentication system 110 based on the OS identification information.

In a practical implementation, there may be more than one computer systems that are configured to be a client computer system, an authentication system and an MTSS. Each of OS 126, OS 146, guest OSes 144A-B, virtual machines 142A-B, storage management controller 171 are part of the one or more computer systems and may be implemented in software, hardware, or a combination of software and hardware. For example, one or more of OS 126, OS 146, guest OSes 144A-B, virtual machines 142A-B, storage management controller 171 may be implemented using stored program logic.

Generating Key Security Token

In an embodiment, a security token is a symmetric key generated by a cryptographic algorithm. Non-limiting examples of cryptographic algorithms include Advanced Encryption Standard (AES), Data Encryption Standard (DES), Rivest Cipher 4 (RC4). The key based security token may be of any size. Larger size keys, such as 2046 bits, lead to better security, however take more compute resources to generate and use.

In an embodiment, an OS may provide a non-key token to an authentication system to be used in data I/O request authentication. A non-key token is a token that is not a key generated by a cryptographic algorithm. Non-limiting examples of non-key tokens are passphrases or biometrics. In such an embodiment, the authentication system generates a security token based on the non-key token by "hashing" the non-key token.

"Hashing algorithm" (or "hashing") refers herein to a technique that maps any length input data to a fixed length data, referred to as a "hash key." The longer the length of the hash key, the more accurately the hash algorithm ensures that different input data produces different hash keys, and that the same input data produces the same hash key. In an embodiment, a hashing algorithm, in addition to input data to be hashed, also takes as an input a key and uses the key to hash input data to a hash key. In such an embodiment, the hashing algorithm produces matching hash keys when both the same input data and the same input key, are used as inputs. If either an input key or input data is not the same, then the hashing algorithm generates a different hash key.

Once a security token is generated through hashing or directly by the OS or the authentication system, the security token is stored in the authentication system in association with the identification information of the OS, in an embodiment. The authentication system makes security tokens available through secure connections with the OS and the MTSS's utilized by the OS.

Generating Authentication Token

Figure 2:
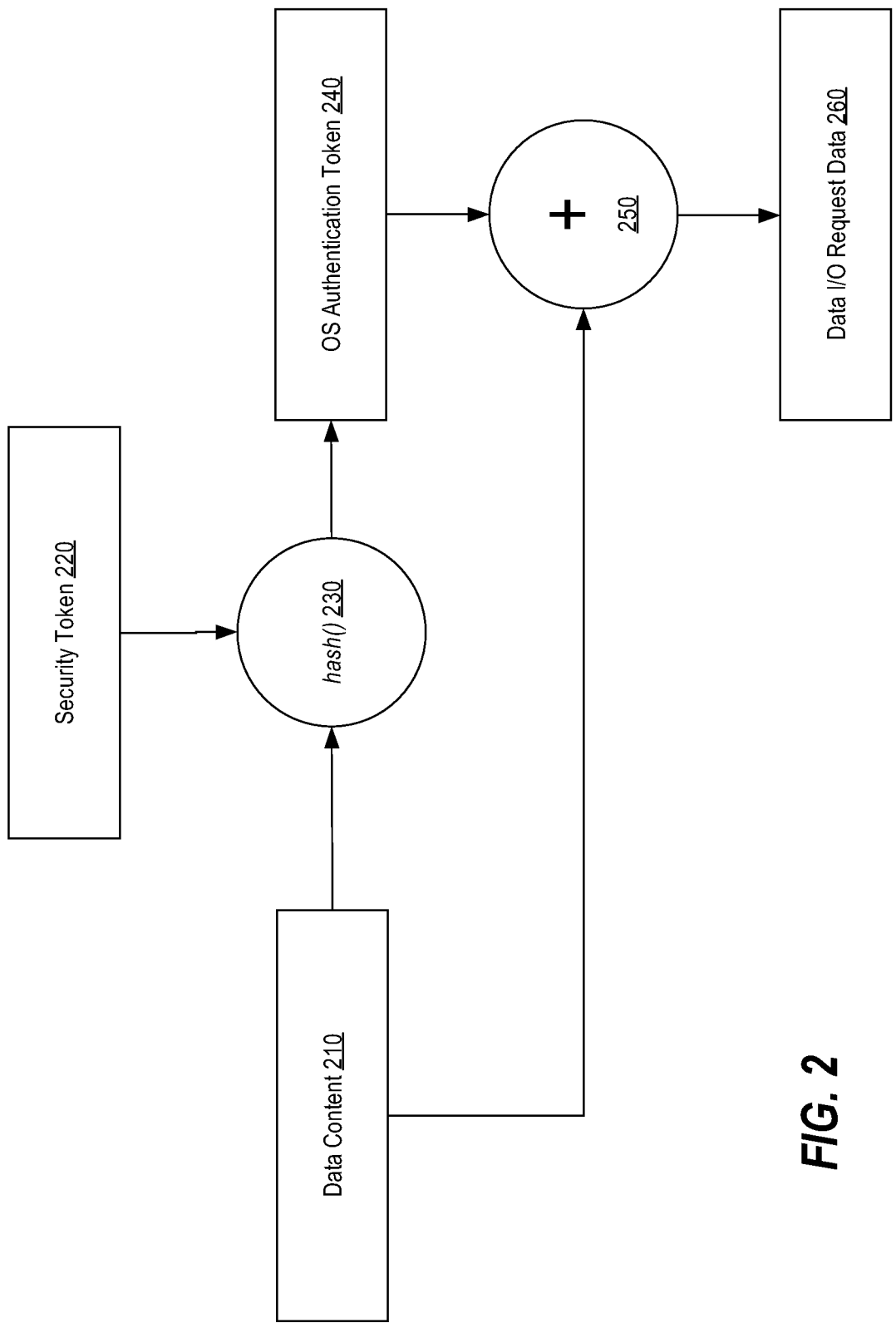
FIG. 2 is a process diagram that depicts program logic for generating data I/O request, in an embodiment.

In an embodiment, before an OS sends a data I/O request, the OS generates an OS authentication token for the data I/O request. FIG. 2 is a process diagram that depicts program logic for generating a data I/O request that includes an OS authentication token of an OS based on a security token associated with the identity information of the OS, in an embodiment. The OS receives a request to read or write data content 210 to a LUN that represents a storage portion on MTSS. Using security token 220, hashing unit 230 is configured to perform hashing on data contents 210. In some embodiments, only the data contents from write requests are hashed, while the data contents from read requests are not hashed. In other embodiments, to reduce processing time, a predetermined portion of data content 210 is hashed by hashing unit 230 (e.g. only the first two bytes), while the rest of data content 210 is not used to generate OS authentication token 240.

The output of the hashing unit 230 is OS authentication token 240. Aggregator 250 is configured to append OS authentication token 240 to data content 210 to generate data I/O request data 260. The OS sends data I/O request data 260 to the MTSS for which data I/O was intended.

Each of hashing unit 230 and aggregator 250 is part of a computer system and may be implemented in software, hardware, or a combination of software and hardware. For example, one or more of hashing unit 230 and aggregator 250 may be implemented using stored program logic.

In an embodiment, in a virtualized environment, in addition to the hypervisor OS performing the process described in FIG. 2, an OS hosted on a virtual machine also generates and appends authorization tokens to the data I/O requests sent to the hypervisor OS. Accordingly, a data I/O request originating from an application within a virtual machine may have two authorization tokens embedded in the data I/O request sent to the MTSS.

For example, application 148A issues a data write request to a LUN that represents storage portion 174A in MTSS 170. Upon the guest OS receipt of the data write request, guest OS 144A queries for the key security token associated with guest OS 144A identity information. Guest OS 144A may query either from authentication system 110 or from a secure local data store on client computer system 140. Using the security token, guest OS 144A performs hashing of the data contents of the data request and generates guest OS 144A authorization token as a result. Guest OS 144A appends the guest OS 144A authorization token to the data contents and performs a data write request to hypervisor OS 146. In response, hypervisor OS 146 retrieves its own associated key security token either from authentication system 110 or from a secure local data store on client computer system 140. Using the hypervisor security token, hypervisor OS 146 performs hashing of data contents of the data request from guest OS 144A to generate hypervisor OS 146 authorization token. The data contents of the data request may include guest OS 144A authorization token, and if so, guest OS 144A authorization token may also be hashed to generate OS 146 authorization token. OS 146 appends the OS 146 authorization token to the data contents of the original request received from guest OS 144A and sends the appended data I/O request to MTSS 170.

Authenticating Data I/O Request

In an embodiment, using a generated storage authentication token, an MTSS may authenticate a data I/O request received from an OS. The storage authentication token is generated from the information in the data I/O request and a security token associated with the OS identification information. In one embodiment, the data I/O request itself contains the identification information about the OS. In another embodiment, the storage management controller of the MTSS determines to which storage portion the data I/O request is addressed, and based on the storage portion, retrieves the identification information of the OS that provisioned the storage portion.

Additionally or alternatively, the MTSS retrieves both the addressed storage portion information as well the identification information about the OS from the data I/O request and compares this information with the identification information about the OS that provisioned the addressed storage portion in the MTSS. If the identification information matches, then the data I/O request is allowed to proceed, otherwise the data I/O request is prevented from further processing and execution.

Using the identification information of the OS, the storage management controller of MTSS retrieves the security token for the OS either by querying an authentication system or by looking up in a local data store of cached security tokens on the MTSS.

Figure 3:
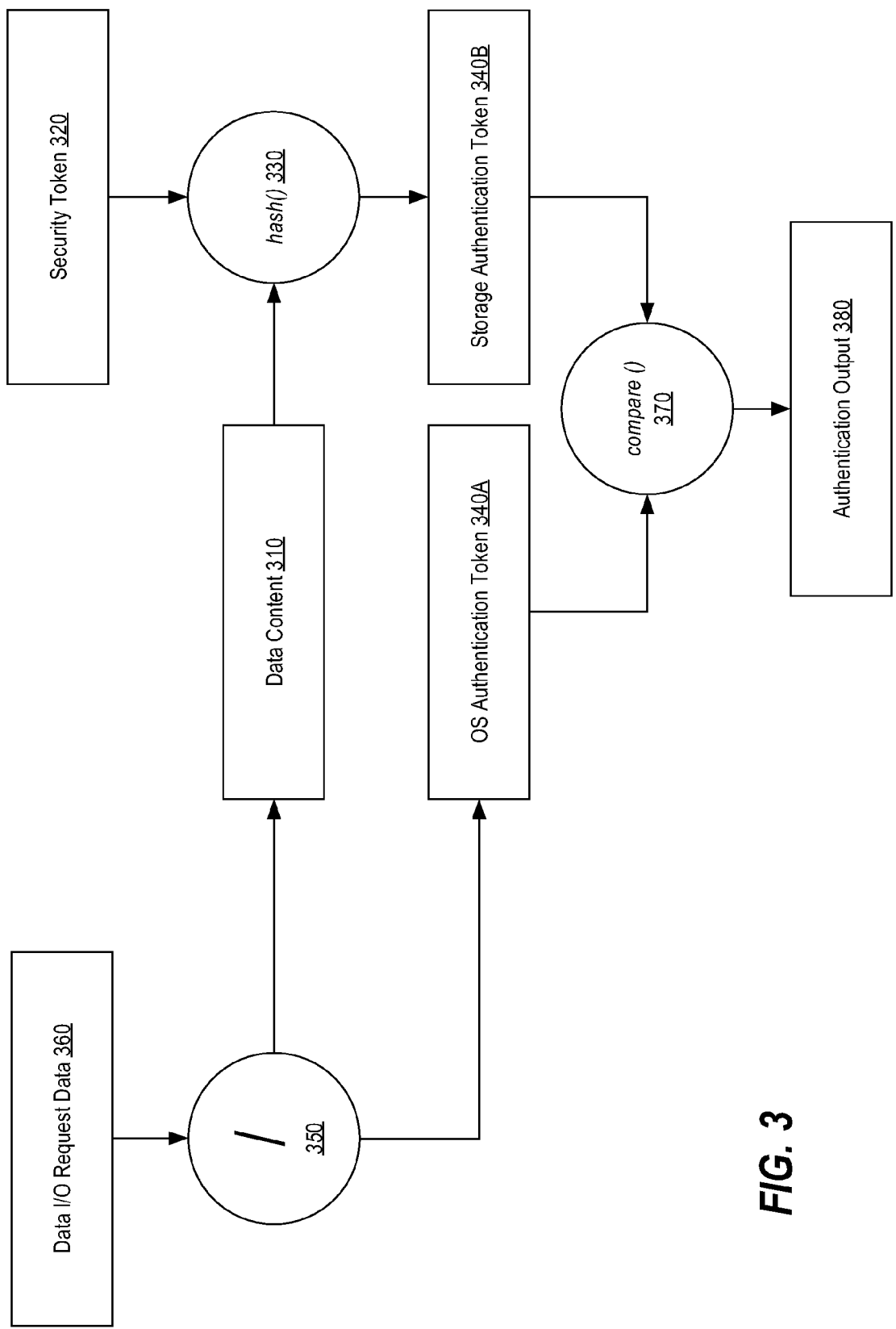
FIG. 3 is a process diagram that depicts program logic to authenticate a received data I/O request, in an embodiment.

FIG. 3 is a process diagram that depicts program logic to authenticate a received data I/O request based on a retrieved security token, in an embodiment. The retrieved security token is represented by security token 320 in FIG. 3. Splitter 350 is configured to split received data I/O request data 360 into data content 310 and OS authentication token 340A. In the embodiment where only a predetermined portion of data content has been hashed in the OS, the same predetermined portion of data content is split from data I/O request data 360 into data content 310.

Accordingly, if data I/O request data 360 (received by the MTSS) corresponds to data I/O request data 260 in FIG. 2 (sent by the OS), then data content 310 corresponds to data content 210, and OS authentication token 340A corresponds to OS authentication token 240, in an embodiment.

Hashing unit 330 is configured to hash data content 310 using the security token 320 to produce storage authentication token 340B. Comparator 370 is configured to compare OS authentication token 340A that was received in data I/O request data 360, with generated storage authentication token 340B on the same data. If the authentication tokens match, then comparator 370's authentication output 380 is positive, and the data I/O request is executed by the storage management controller. If the authentication tokens fail to match, then comparator 370's authentication output 380 is negative and the data I/O request is not executed by the storage management controller.

Each of splitter 350, hashing unit 330 and comparator 370 may be part of a client computer system, an authentication system or an MTSS and may be implemented in software, hardware, or a combination of software and hardware. For example, one or more of splitter 350, hashing unit 330 and comparator 370 may be implemented using stored program logic.

In an embodiment, the mismatch of OS authentication token 340A and storage authentication token 340B denotes that either a malicious entity has tampered with the original I/O request or the sending OS has been compromised. If after the generation of OS authentication token 340 but before the receipt by the MTSS, a malicious entity have interfered and tampered with the request, then data content 310 would be different from data content 210. Accordingly, storage authentication token 340B generated from data content 310 would be different from OS authentication tokens 240/340A generated based on data content 210 before sending the data I/O request to the MTSS.

On the other hand, if a compromised OS sends the mismatched data I/O request data 360, the security tokens used in hashing would be different between OS and the MTSS. In one embodiment, the OS may be compromised to send a malicious data I/O request for a storage portion that is not allocated to that OS. In such case, security token 220 would be different from security token 320 because the compromised OS would not have access to the original OS security token. The compromised OS would not be able to request the original OS security token from the authentication system because the compromised OS's identification information is different. Additionally or alternatively, the compromised OS would not have access to the local store of the original OS where the correct security token may be stored. Thus, the compromised OS's security token 220 would be different from the original OS's security token 220 and thus having different security token, the produced OS authentication token 240/340A would be different than storage authentication token 340B produced using the original OS's security token.

Continuing with the above example of the application 148A data I/O request, MTSS 170 receives the data I/O request from client computer system 140 either through network 150 or storage area network 160. Upon receipt, storage management controller 171 identifies that the data I/O request is directed to storage portion 176 and more particularly to storage portion 174A. Since storage portion 176 has been allocated to hypervisor OS 146 and storage portion 174A has been allocated to guest OS 144A, storage management controller 171 retrieves identification information for hypervisor OS 146 and guest OS 144A, respectively. Alternatively, storage management controller 171 may examine the data I/O request for WWN, MAC address or other source information embedded in the request as identification information to retrieve security tokens for the OSes.

In an embodiment, storage management controller 171 initiates a secure connection with authentication system 110 and using the identification information queries for the security tokens of hypervisor OS 146 and guest OS 144A in security token data 112. In response to the query, authentication system 110 returns to storage management controller 171 hypervisor OS 146 security token and guest OS 144A security token.

Figure 4:
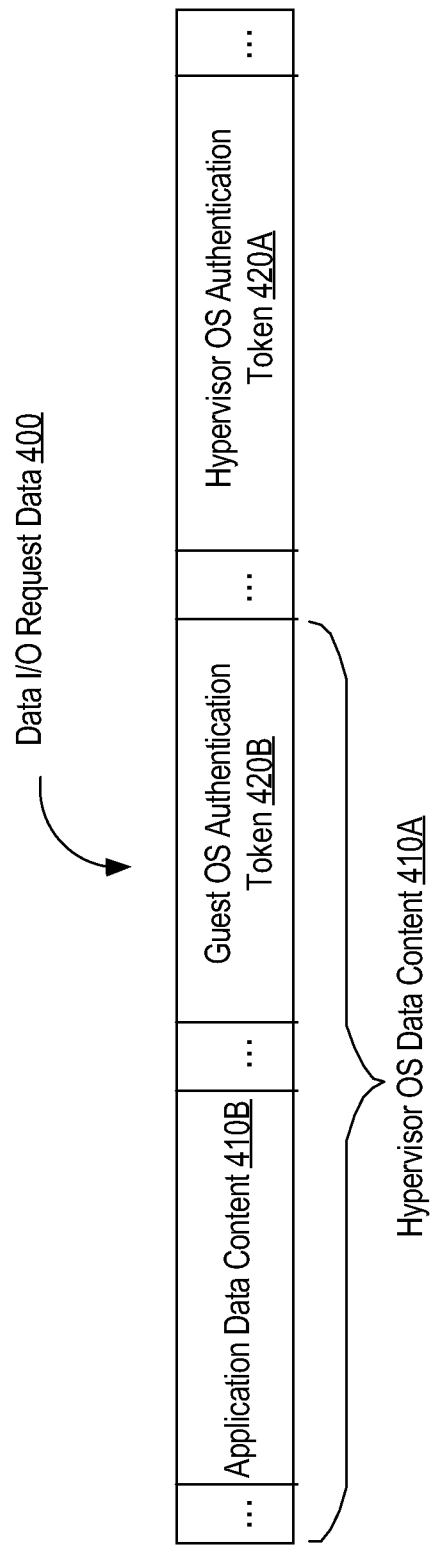
FIG. 4 depicts an example of data I/O request data that originates from a guest OS hosted on a hypervisor OS.

Storage management controller 171 parses the received data I/O request data to retrieve data contents and embedded authentication tokens. FIG. 4 depicts an example of such data I/O request data 400 originating from a guest OS hosted on a hypervisor OS. Storage management controller 171 retrieves hypervisor OS authentication token 420A and hypervisor OS data content 410A from the data I/O request data 400. The hashing unit of storage management controller 171 performs hashing on hypervisor OS data content 410A using hypervisor OS 146 security token received from authentication system 110 to produce a storage authentication token. The produced storage authentication token is compared with hypervisor OS authentication token 420A. If the authentication tokens fail to match, then either data I/O request data 400 has been compromised: for example, either the contents have been tampered with during transmission from hypervisor OS 146 to MTSS 170, or an entity other than hypervisor OS 146 has sent the data I/O request.

On the other hand, the matched authentication tokens denote that the data I/O request has not been compromised after hypervisor OS 146 processing. However, in an embodiment, there is still a risk that the data I/O request may have been compromised before the request was sent by hypervisor OS 146. For example, hypervisor OS 146 may have been compromised, or malicious guest OS 144B has originated the data I/O request for storage portion 174A instead of storage portion 174B. To alleviate this risk, the guest OS data I/O request for storage portion 174A is also authenticated, in an embodiment.

Storage management controller 171 retrieves guest OS authentication token 420B and guest OS application data content 410B from the data I/O request data 400. The hashing unit of storage management controller 171 performs hashing on guest OS application data content 410B using guest OS 144A security token received from authentication system 110 to produce a guest OS storage authentication token. The produced guest OS storage authentication token is compared with guest OS authentication token 420B. If the authentication tokens fail to match, then the data I/O request has been compromised before sending by hypervisor OS 146. For example, either data I/O request data 400 has been tampered with in hypervisor OS 146, or an entity other than guest OS 144A has sent the data I/O request in the first place.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    a storage system processing a plurality of data input/output (I/O) requests on a persistent storage managed by the storage system, the processing comprising:
        receiving, over a network, a data I/O request comprising a plurality of pairs of authentication tokens and operating system (OS) content, wherein an authentication token of each pair, of the plurality of pairs, is used for authenticating with the storage system a corresponding operating system that originated OS content of said each pair;

for said each pair of the plurality of pairs:
making a determination of validity of the authentication token for the corresponding operating system;
based on the determination of validity, identifying a next authentication token from a next pair, of the plurality of pairs, corresponding to a next operating system for authenticating with the storage system the next operating system, that originated next OS content of the next pair;
if at least one authentication token in the plurality of pairs is determined to be invalid, preventing the storage system from processing the data I/O request on the persistent storage; and
if each authentication token in the plurality pairs is determined to be valid, processing the data I/O request on the persistent storage by the storage system.

2. The method of claim 1, wherein the next pair of the plurality of pairs is part of the OS content of said each pair of the plurality of pairs.

3. The method of claim 1, further comprising, for said each pair of the plurality of pairs, determining respective identification information about the corresponding operating system of said each pair from information in the data I/O request.

4. The method of claim 3, wherein the respective identification information includes at least one of: an internet address, a Small Computer System Interface (SCSI) name, a media access control (MAC) address, a world-wide name (WWN), a host name or a fully qualified domain name.

5. The method of claim 3, further comprising for said each pair in the plurality of pairs, querying for a corresponding storage security token based on the respective identification information about the corresponding operating system of said each pair.

6. The method of claim 5, further comprising, for said each pair of the plurality of pairs, making the determination for validity of the authentication token for the corresponding operating system by:
computing a respective storage authentication token based on the corresponding storage security token queried for and the OS content of said each pair; and
comparing the respective storage authentication token with the authentication token of said each pair.

7. The method of claim 5, wherein the corresponding storage security token is stored on an authentication system in association with the respective identification information about the corresponding operating system.

8. The method of claim 1, further comprising identifying a last authentication token, in the plurality of pairs, corresponding to a last operating system for authenticating with the storage system the last operating system that originated last OS content of the last pair.

9. The method of claim 8, further comprising:
identifying from the last OS content a requested portion of the persistent storage to process the data I/O request for;
processing the data I/O request by either storing at least a portion of the last OS content in the requested portion of the persistent storage or reading data from the requested portion of the persistent storage.

10. The method of claim 1, wherein at least one pair of the plurality of pairs corresponds to a host operating system and a particular pair included in OS content of the at least one pair corresponds to a guest operating system of the host operating system.

11. One or more non-transitory computer-readable media storing instructions, wherein the instructions include instructions, which when executed by one or more hardware processors, cause:
a storage system processing a plurality of data input/output (I/O) requests on a persistent storage managed by the storage system, the processing comprising:
receiving, over a network, a data I/O request comprising a plurality of pairs of authentication tokens and operating system (OS) content, wherein an authentication token of each pair, of the plurality of pairs, is used for authenticating with the storage system a corresponding operating system that originated OS content of said each pair;
for said each pair of the plurality of pairs:
making a determination of validity of the authentication token for the corresponding operating system;
based on the determination of validity, identifying a next authentication token from a next pair, of the plurality of pairs, corresponding to a next operating system for authenticating with the storage system the next operating system, that originated next OS content of the next pair;
if at least one authentication token in the plurality of pairs is determined to be invalid, preventing the storage system from processing the data I/O request on the persistent storage; and
if each authentication token in the plurality pairs is determined to be valid, processing the data I/O request on the persistent storage by the storage system.

12. The one or more non-transitory computer-readable media of claim 11, wherein the next pair of the plurality of pairs is part of the OS content of said each pair of the plurality of pairs.

13. The one or more non-transitory computer-readable media of claim 11, wherein instructions further include instructions, which when executed by said one or more hardware processors, cause, for said each pair of the plurality of pairs, determining respective identification information about the corresponding operating system of said each pair from information in the data I/O request.

14. The one or more non-transitory computer-readable media of claim 13, wherein the respective identification information includes at least one of: an internet address, a Small Computer System Interface (SCSI) name, a media access control (MAC) address, a world-wide name (WWN), a host name or a fully qualified domain name.

15. The one or more non-transitory computer-readable media of claim 13, wherein instructions further include instructions, which when executed by said one or more hardware processors, cause, for said each pair in the plurality of pairs, querying for a corresponding storage security token based on the respective identification information about the corresponding operating system of said each pair.

16. The one or more non-transitory computer-readable media of claim 15, wherein instructions further include instructions, which when executed by said one or more hardware processors, cause, for said each pair of the plurality of pairs, making the determination for validity of the authentication token for the corresponding operating system by:

computing a respective storage authentication token based on the corresponding storage security token queried for and the OS content of said each pair; and comparing the respective storage authentication token with the authentication token of said each pair.

17. The one or more non-transitory computer-readable media of claim 15, wherein the corresponding storage security token is stored on an authentication system in association with respective the identification information about the corresponding operating system.

18. The one or more non-transitory computer-readable media of claim 11, wherein instructions further include instructions, which when executed by said one or more hardware processors, cause identifying a last authentication token, in the plurality of pairs, corresponding to a last operating system for authenticating with the storage system the last operating system that originated last OS content of the last pair.

19. The one or more non-transitory computer-readable media of claim 18, wherein instructions further include instructions, which when executed by said one or more hardware processors, cause:

identifying from the last OS content a requested portion of the persistent storage to process the data I/O request for;

processing the data I/O request by either storing at least a portion of the last OS content in the requested portion of the persistent storage or reading data from the requested portion of the persistent storage.

20. The one or more non-transitory computer-readable media of claim 11, wherein at least one pair of the plurality of pairs corresponds to a host operating system and a particular pair included in OS content of the at least one pair corresponds to a guest operating system of the host operating system.

* * * * *